Figure 1:
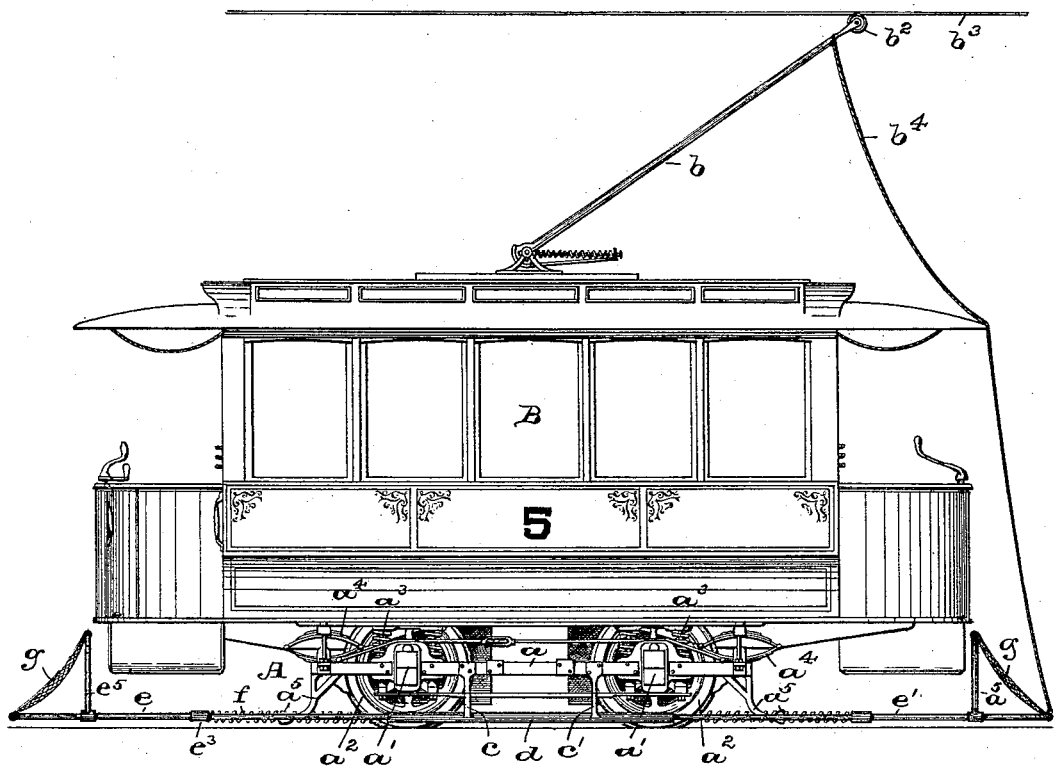

(No Model.) 2 Sheets—Sheet 1.

J. McCARTHY.
FENDER FOR CARS.

No. 529,041. Patented Nov. 13, 1894.

WITNESSES:
Wm. H. Camfield, Jr.
H. W. Marsh

INVENTOR:
JOHN McCARTHY.
BY Fred't C. Fraentzel, ATT'Y.

(No Model.) 2 Sheets—Sheet 2.

J. McCARTHY.
FENDER FOR CARS.

No. 529,041. Patented Nov. 13, 1894.

WITNESSES:
Wm. H. Canfield Jr.
H. M. Marsh

INVENTOR:
JOHN McCARTHY.
BY Fred C. Fraentzel, ATT'Y.

UNITED STATES PATENT OFFICE.

JOHN McCARTHY, OF NEWARK, NEW JERSEY.

FENDER FOR CARS.

SPECIFICATION forming part of Letters Patent No. 529,041, dated November 13, 1894.

Application filed June 2, 1894. Serial No. 513,229. (No model.)

*To all whom it may concern:*

Be it known that I, JOHN MCCARTHY, a citizen of the United States, residing at Newark, in the county of Essex and State of New Jersey, have invented certain new and useful Improvements in Fenders for Cars; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in fenders for cars, and has for its primary object to provide a means whereby the fender or guard may have a horizontal position and a reciprocatory sliding movement beneath the car, the fender being constructed in such a manner that, when the forward end of the fender or guard frame comes in contact with an object on the track, it receives a limited sliding movement in bearings secured to the car-wheel truck frame, thus causing the fender to strike the object with less force, and more readily picking up such object.

A further object of the invention is to construct a fender frame, to be used in combination with the car-wheel truck, to which it is attached, so that the frame will at all times remain at the same height above the grade of the rails and hence can not be affected by the various loads within the car.

A further object is to provide in connection with my novel form of fender, means, whereby, when said fender strikes an obstruction upon the track and slides back, the trolley wheel against the trolley wire is immediately thrown off, thereby automatically shutting off the current from the motor underneath the car.

The invention therefore consists of the novel form of spring-actuated fender or guard frames, constructed to slide back and forth in suitable guides or bearings attached to the bearing-bars of the wheel truck. These bars, as will be obvious, always remain in the same position in a horizontal plane above the grade, no matter how much the positions of the car-body may vary, and hence, by attaching my fender frame directly to said truck-bars, I can bring the frame much closer down to the surface of the track, than can be done in constructions where the fender frame and mechanism is secured directly to the car-body. The sliding movement of the fender frames further permits the coupling together of any two cars provided with fenders of the novel construction to be hereinafter more fully described and finally embodied in the clauses of the claims.

The invention further consists in certain minor novel arrangements and combinations of parts, to be hereinafter more fully set forth.

The invention is illustrated in the accompanying sheets of drawings, in which—

Figure 2:
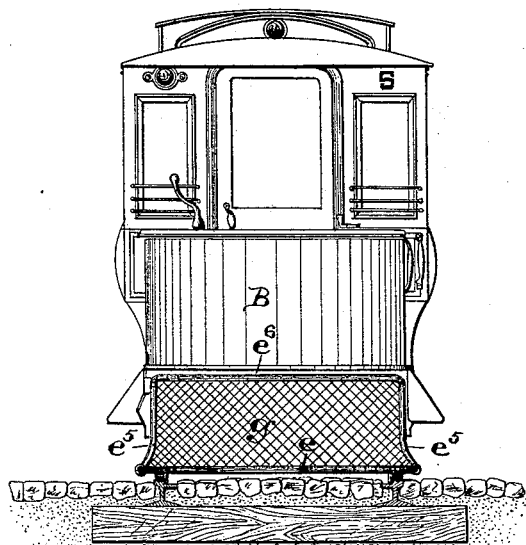
Figure 3:
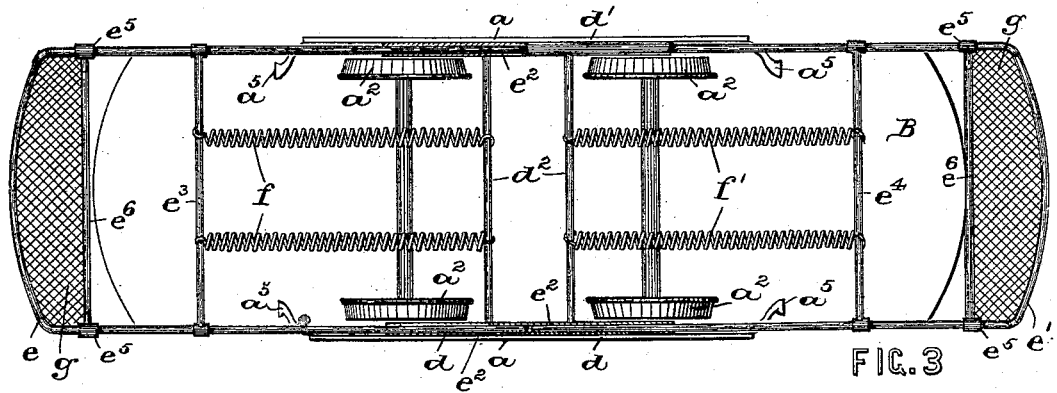
Figure 4:
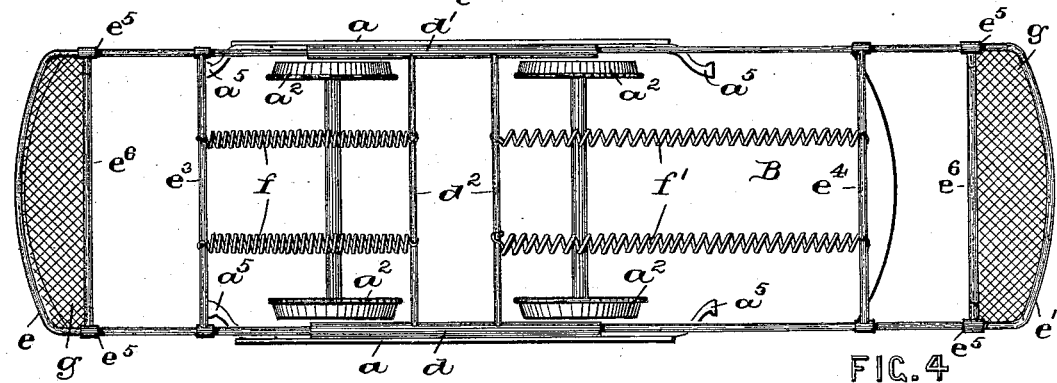
Figure 5:
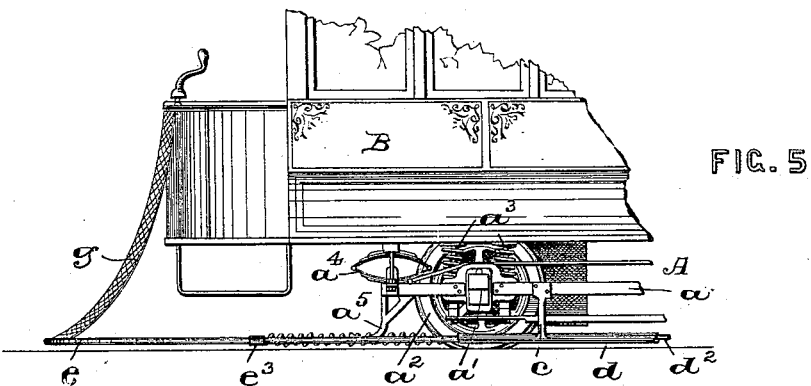

Figure 1 is a side view of a car and its truck having my novel form of fender or guard, and illustrating in connection therewith, means connected with the fender frame and adapted to be operated thereby for throwing off the trolley wheel from the trolley wire when the fender frame slides backward. Fig. 2 is an end view of the car and fender. Fig. 3 is a bottom view of the truck and fender, illustrating the arrangement of the two separable fender frames in guides or bearings on the bearing-bar of the truck-frame; and Fig. 4 is a similar view of the parts illustrated in said Fig. 3, showing the sliding feature of the fender frame in its bearings. Fig. 5 is a side view of one end of a car having my novel form of fender, provided with a catch-apron extending from the front of the fender-frame to near the top of the dash board of the car.

Similar letters of reference are employed in each of the above described views, to indicate corresponding parts.

In said drawings B represents the car-body provided with the usual form of trolley pole $b$ and wheel $b^2$ in contact with the trolley wire $b^3$.

A is the truck of the car provided with the usual form of bearing bars $a$ on opposite sides of the truck, in the ends of which are fixed the boxes $a'$ for the car-wheels $a^2$.

The car-body B is fixed by springs $a^3$ and $a^4$ on said truck frame, and any swinging or jolting motion of the car-body will not therefore affect the positions of said bars $a$, which will at all times remain at the same height above the grade of the rails, as will be obvious from an inspection of Fig. 1. To said bearing bars $a$ of the truck are fixed suitable hangers $c$ and $c'$, to which are attached or secured in any well known manner, suitable pieces of tubing or pipes $d$ and $d'$.

The fender or guard frame proper, consists essentially of two U-shaped frames $e$ and $e'$, having their ends $e^2$ inserted in said pipes or tubes $d$ and $d'$ forming guides or bearing therefor as will be clearly seen from Figs. 3 and 4. Said pipes $d$ and $d'$ are preferably connected by means of suitable rods $d^2$, while the frame $e$ is provided with a rod $e^3$ and the frame $e'$ with a similar rod $e^4$. Coiled springs $f$ and $f'$ are used to connect said bars $e^3$ and $e^4$ on said U-shaped frames with the cross-bars $d^2$ connecting the pipes $d$ and $d'$, and thus it will be seen, that when the ends $e^2$ of said frame are arranged in the pipes $d$ and $d'$, said springs will cause said ends to be drawn against each other, as clearly indicated in said Fig. 3. Said springs $f$ and $f'$, are all of equal tension, so that the free ends of both frames $e$ and $e'$ will extend equally into said bearings or guides $d$ and $d'$, and the fender frames will extend equally beyond the rear and front platform of the car.

From Figs. 1, 2 and 3, it will be seen, that said frames $e$ and $e'$ are provided with suitable uprights $e^5$ and a connecting piece $e^6$ to which is secured a suitable apron $g$, either of cloth or woven wire.

In Fig. 4, I have illustrated the position of the fender, when one of said fender frames, as $e$, has come in contact with an object on the track.

Immediately upon the fender or guard striking an object, the frame $e$ is pushed inwardly, compressing the springs $f$. The arms $e^2$ of said frame $e$, sliding in the bearings $d$ and $d'$, will cause the frame $e'$ to assume the position indicated in said Fig. 4, thereby distending the springs $f'$. In this manner, in striking the object the main force of the blow is weakened and the person is safely thrown upon the apron $g$; and at the same time said distended springs $f'$ will cause the two frames $e$ and $e'$ to assume their normal positions, indicated in Fig. 3.

As will be seen from the several figures of the drawings, said bearing bars $a$ of the truck frame, are provided with downwardly extending stops $a^5$, on each of said bars $a$, against which said cross-bars $e^3$ and $e^4$ on the respective frames $e$ and $e'$ may come in contact, see Fig. 4, to limit the sliding movement of said frames.

In lieu of the form of apron illustrated in Figs. 1 and 2, I may dispense with the uprights $e^5$ and connecting pieces $e^6$ and use a flexible apron which is secured directly to the front of each fender and to the top of each dash-board, as represented in Fig. 5, in order to protect a person from contact with the bumper and coupling pin. Owing to the sliding movement of said frames $e$ and $e'$, any two cars can be coupled together, and when the form of apron, illustrated in Fig. 5 is used, it can be unhooked from the dash board and fastened to the U-shaped frame to enable the coupling together of two cars.

As will be seen from Fig. 1, the trolley rope $b^4$ extends down over the rear dash board and may be attached to the end of the U-shaped fender frame. As soon as the fender strikes an object on the track and the frame $e'$ is pushed out from the back of the car, said rope $b^4$ is pulled taut, thereby throwing off the trolley wheel $b^2$ from its contact with the wire $b^3$ and immediately and automatically shutting off the electrical current to the motor underneath the car.

By securing the fender-frames in the guides or bearings directly to the fixed bearing bars $a$ of the wheel truck, it will be evident, that the fender frame can be brought very low down to nearly touch the tracks, for no matter how great the weight in the car, and how much the front platform of the car may be raised higher than the back platform, due to the passengers riding on the back platform, said fender frame will always retain its horizontal position above the rails, and the edge of the fender is prevented from being brought in contact with the ground thereby avoiding liability of accident. Said guides or bearings $d$ and $d'$ are made of sufficient length to prevent the sagging of the free end of said frames $e$ and $e'$, and thus avoiding the liability of the front end of the fender striking the ground and catching under a stone or other obstruction.

Having thus described my invention, what I claim is—

1. The herein described fender, consisting essentially of U-shaped frames $e$ and $e'$, having connecting bars $e^3$ and $e^4$, and an apron $g$, in combination, with the bearing bars $a$ of the wheel-truck of a car, and tubular guides or bearings $d$ and $d'$ on said bars $a$, in each of which the free ends of said frames $e$ and $e'$ are adapted to slide, and equalizing springs connected with said bars $e^3$ and $e^4$ and said guides or bearings, substantially as and for the purposes set forth.

2. In a fender for cars, the combination, with the fender or guard secured to slide in a supporting frame, of a trolley pole and its wheel, and means connecting said trolley pole with the fender, whereby the backward movement of said fender will disconnect the trolley wheel from the trolley wire, substantially as and for the purposes set forth.

3. In a railway car, the combination of the trolley pole and wheel, with a fender or guard arranged to have a reciprocatory sliding and horizontal movement in bearing or guides on the wheel truck of the car, and a trolley rope connected with said fender and trolley pole, substantially as and for the purposes set forth.

4. In a railway car, in combination, with the wheel-truck of the car, guides or bearings arranged on the bearing-bars of the truck, U-shaped fender frames $e$ and $e'$ arranged to slide in said guides or bearings, provided with fender aprons, equalizing springs connected with said U-shaped frames and bearings on said bearing bars, a trolley pole and wheel on the car, and a trolley rope connected with said pole and one of said U-shaped frames, substantially as and for the purposes set forth.

In testimony that I claim the invention set forth above I have hereunto set my hand this 29th day of May, 1894.

JOHN McCARTHY.

Witnesses:
   FREDK. C. FRAENTZEL,
   WM. H. CAMFIELD, Jr.